D. A. LYTLE.
ADJUSTABLE FLORAL DECORATION HOLDER.
APPLICATION FILED AUG. 1, 1911.
1,024,215.
Patented Apr. 23, 1912.
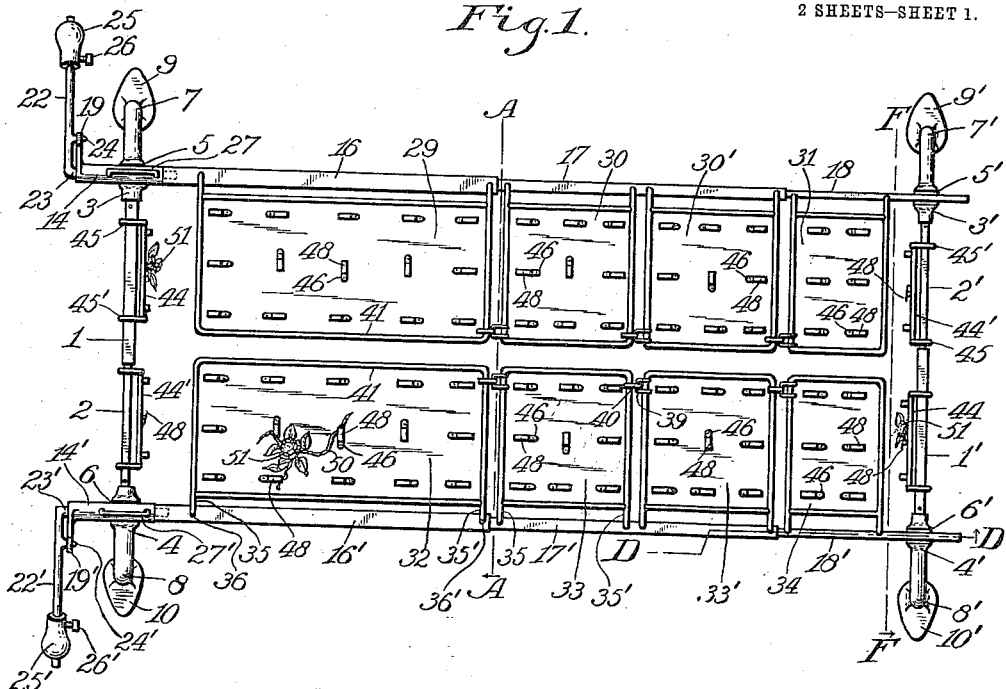
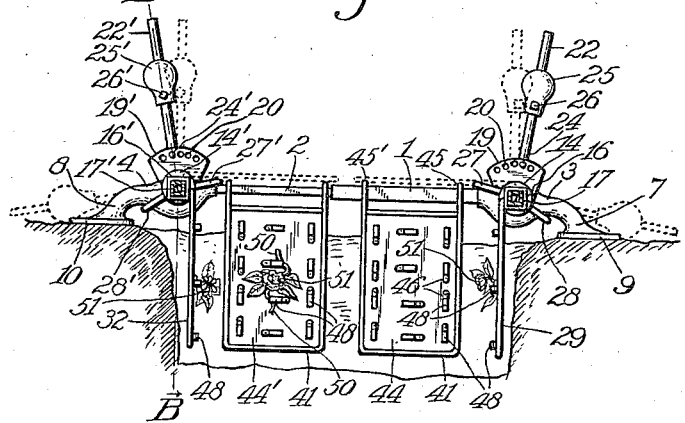
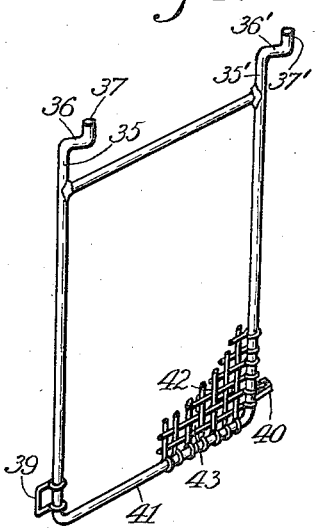
WITNESSES:
J. H. Gardner.
M. M. Thomas.
INVENTOR:
David A. Lytle,
BY
E. T. Silvius,
ATTORNEY.

D. A. LYTLE.
ADJUSTABLE FLORAL DECORATION HOLDER.
APPLICATION FILED AUG. 1, 1911.
1,024,215.
Patented Apr. 23, 1912.
2 SHEETS—SHEET 2.
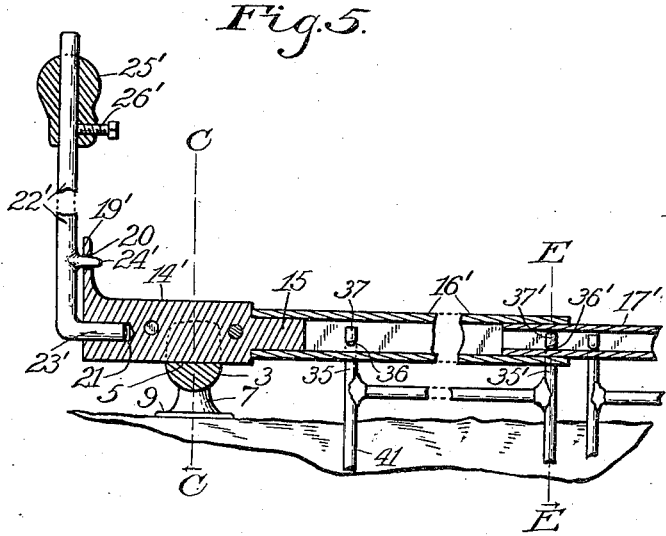
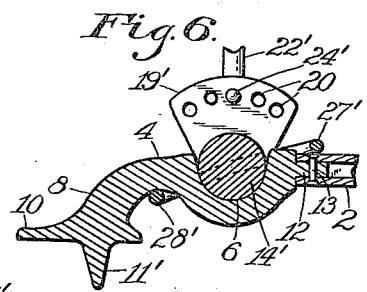
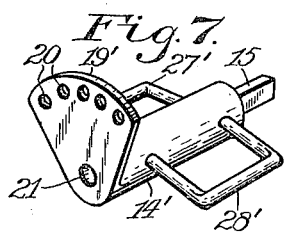
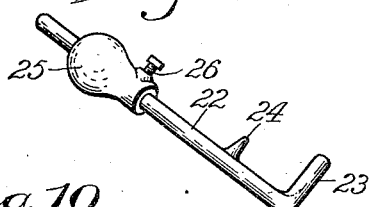
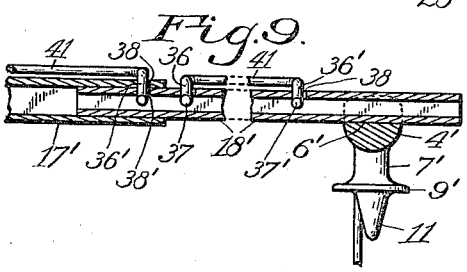
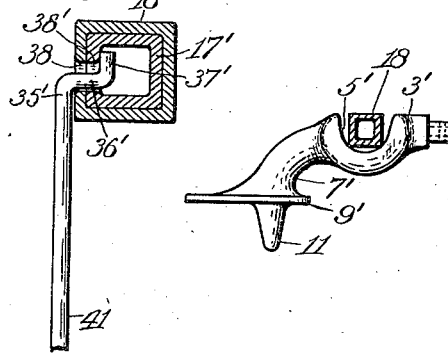
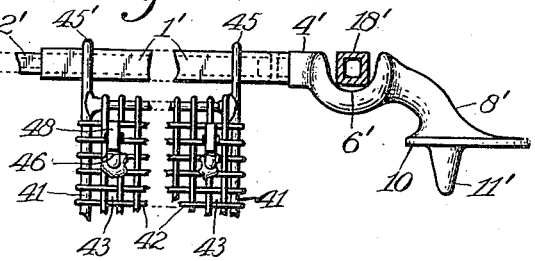
WITNESSES:
J. H. Gardner
M. M. Thomas
INVENTOR:
David A. Lytle,
BY
E. T. Silvius,
ATTORNEY.

UNITED STATES PATENT OFFICE.

DAVID A. LYTLE, OF INDIANAPOLIS, INDIANA, ASSIGNOR OF ONE-FOURTH TO WILLIAM F. LYTLE AND ONE-FOURTH TO JOHN H. LYTLE, BOTH OF INDIANAPOLIS, INDIANA.

ADJUSTABLE FLORAL-DECORATION HOLDER.

1,024,215. Specification of Letters Patent. Patented Apr. 23, 1912.

Application filed August 1, 1911. Serial No. 641,866.

*To all whom it may concern:*

Be it known that I, DAVID A. LYTLE, a citizen of the United States, residing at Indianapolis, in the county of Marion and State of Indiana, have invented a new and useful Adjustable Floral-Decoration Holder, of which the following is a specification, reference being had to the accompanying drawings and to the letters and figures of reference marked thereon.

This invention relates to apparatus that is designed to be used in association with funeral programs, especially when interment in the ground takes place, the invention having reference particularly to portable knock-down apparatus adapted to be placed upon the ground at a grave for holding floral decorations, so as to cover the grave temporarily and hide it from the view of the mourners assembled.

The object of the invention is to provide a floral decoration holder that will be adapted to be used by funeral directors or undertakers, or others in the conducting of burials, for the purpose of relieving the mourners of the necessity of gazing into the gravel prepared for deceased relatives or friends, while the coffin is being placed in position over the grave and while lowering it to its final resting place; a further object being to provide a simple, durable and economical appliance of the above mentioned character that will be adapted to be used for directing the attention of the attending mourners to more pleasing objects than the unsightly excavation for the grave.

The invention comprises a portable, adjustable frame of novel construction adapted to be set up on the ground adjacent a grave for holding floral decorations, either natural or artificial, so as to cover the grave before the funeral procession arrives thereat, and to obscure the grave until the casket is lowered into it, the apparatus and decorations being designed to obscure the walls of the grave while the casket is being lowered.

The invention consists also in certain novel parts, and in the combinations and arrangements of parts, as hereinafter particularly described and claimed.

Referring to the drawings, Figure 1 is a top plan of the decoration holder arranged as when in practical use, a number of roses being applied thereto as illustrative of the purpose of the invention; Fig. 2, a fragmentary cross section of a grave and the apparatus arranged therein as appearing during the lowering of the casket, the apparatus being in section on the plane of the line A A in Fig. 1; Fig. 3, a perspective view of the frame of one of the wings for directly holding the decorations and illustrating the details of construction thereof; Fig. 4, a fragmentary perspective view of a portion of one of the wings and fasteners provided for securing the decorations removably thereto; Fig. 5, a fragmentary section on the line B B in Fig. 2; Fig. 6, a fragmentary section on the line C C in Fig. 5; Fig. 7, a perspective view of one of the parts of the apparatus; Fig. 8, a perspective view of one of the operating arms of the apparatus; Fig. 9, a fragmentary section on the line D D in Fig. 1; Fig. 10, a fragmentary section on the line E E in Fig. 5; and Fig. 11, a fragmentary sectional elevation on the line F F in Fig. 1.

Similar reference characters in the different figures of the drawings indicate corresponding elements or features of construction herein referred to.

The invention includes, broadly, a rectangular frame adapted to rest upon the ground and provided with wings to be supported thereby either in approximately horizontal position or in substantially vertical depending position. The frame includes essentially a head rail and a foot rail, both being practically alike, the head rail comprising a hollow section 1, a section 2 inserted movably in the section 1 so that the rail is extensible or contractible, and the two sections are provided respectively with fixedly connected heads 3 and 4, in the tops of which journal bearings 5 and 6 are formed, the heads having down turned portions constituting short supporting legs 7 and 8 provided with broad feet 9 and 10 respectively that are adapted to rest upon the ground, the feet having spurs 11 and 11' thereon respectively that are adapted to enter the ground to prevent the feet from being accidentally shifted after the rail has been adjusted to the desired length. Each head preferably has a stud 12 thereon that extends into the hollow section and is secured thereto by means of a rivet 13. The sections of the rail preferably are composed of tubes that are square in cross section. The foot rail comprises two hollow sections 1' and 2' telescoped together, provided respectively with heads 3' and 4' in which are journal bearings 5' and 6' respectively, the heads having legs 7' and 8' provided with feet 9' and 10' respectively that are provided also with the spurs 11 and 11'. The frame includes also two side rails which are extensible or contractible in length and are required to rotate approximately one quarter of a revolution in the journal bearings of the head and foot rails. The side rails comprise cylindrical journal members 14 and 14' respectively that are mounted removably in the journal bearings 5 and 6, each member having a squared end projection 15 whereby to connect it removably with a rail section, there being hollow sections 16 and 16' connected to the members 14 and 14' respectively, intermediate rail sections 17 and 17' being telescopically inserted in the main sections 16 and 16' respectively, and terminal rail sections 18 and 18' are inserted in the intermediate sections, the terminal sections being mounted in the bearings 5' and 6' respectively.

The side rails, as will be seen, may be adjusted to various lengths and in some cases the terminal sections may be withdrawn, and obviously at the graves of infants the main sections alone may be used and the head and foot rails shortened to suit the relatively narrow grave. The journal members 14 and 14' are provided with quadrants 19 and 19' respectively that are each provided with pin holes 20, each of said members having a socket 21 at its axis of rotation. Two operating arms 22 and 22' are provided which have studs 23 and 23' thereon respectively adapted to fit removably into the sockets, the arms having also relatively short pins 24 and 24' thereon adapted to enter either one of the pin holes 20. The arms have hollow weights 25 and 25' thereon that are arranged adjustably, and secured respectively by means of set screws 26 and 26'. When the arms rest on the ground they prevent rotation of the side rails under ordinary conditions, but the side rails may be turned in their bearings by means of the arms, and as will be seen, the arms may be adjusted relatively to the rails by shifting the pins 24 and 24' into different pin holes in the quadrants, as may be desirable owing to unevenness of the ground surface. In some cases the adjustment of the arms may be such that when raised from the ground to upright position they may turn over beyond the vertical, and in order to prevent the rails from turning more than is desired, the members 14 and 14' are provided with loop shaped stops 27 and 27' adapted to contact with the top of the head rail and similar stops 28 and 28' respectively adapted to contact with the under sides of the heads 3 and 4. In some cases, however, either one of the stops may be omitted from each journal member.

One side rail of the frame is provided with a suitable wing 29 that is removably connected to the section 16, relatively shorter wings 30 and 30' being removably connected to the rail section 17, and a still shorter wing 31 is removably connected to the section 18. The companion rail is provided also with a plurality of companion wings, a wing 32 being removably connected to the rail section 16', shorter wings 33 and 33' being connected to the rail section 17', and a still shorter wing 34 is connected to the terminal rail section 18'. The wings of the two rails are substantially alike but those of one series are adapted to be right hand and those of the other series, left hand. The wings may be composed of any suitable or desired material, such as sheet metal, for instance, suitably reinforced, and the wings may be connected in any suitable or desired manner to the side rails of the frame. As illustrated each wing has two arms 35 and 35' thereon which have right angled portions 36 and 36' on the ends of which are lateral lugs 37 and 37' respectively, the lugs and the right angled portions being inserted in suitable perforations 38 and 38' in the walls of the side rails, and the lugs engage the inner sides of the walls adjacent the perforations. It will be understood that in some portions of the rails the arms are connected only to one section of the rail.

Preferably each two adjacent wings are connected detachably together at their free ends, one wing being provided with a loop 39 at one side thereof and a suitable clasp 40 at the opposite side thereof adapted to clasp the loop of the adjacent wing. In some cases the wings may have suitable frames 41 to which suitable main portions of the wings are attached and permissibly composed of woven wires or threads 42, as shown in Figs. 3 and 11, so that the wings have small openings 43 or are reticulate, so that threads or cords may be passed through the body portions of the wings for securing the flowers thereto. A suitable number of somewhat similar wings 44 and 44' are provided for the head rail and a like number for the foot rail, each wing being provided with two hooks 45 and 45' for hanging it on the rail, the wings remaining in hanging position in the grave and not required to be held in horizontal position.

Preferably each wing is provided with a suitable number of clasps comprising each a base 46 secured to the wing and provided with a pivot 47 to which a tilting jaw 48 is connected between its ends, one end of the jaw being normally held to the base by means of a suitable spring 49. The clasps are adapted to hold the stems 50 of roses or flowers 51 comprising the decorations and permitting of their removal. Each wing should be covered on one side with the floral decorations, and if artificial, the decorations may be used indefinitely. The flowers or foliage may extend beyond the edges of the wings so that the wings are obscured when in operative position.

In practical use the apparatus is placed upon the ground and adjusted as to size so that the wings may be lowered into the excavation and obscure the side walls, the wings that are hung on the head and foot rails obscuring the walls at the head and foot of the grave. The adjustment of the operating arms 22 and 22' relative to the side rails should be made so as to permit the weights on the arms to rest on the ground when the wings that are on the side rails extend horizontally, the weights being designed to be sufficient to over balance the weight of the wings and decorations thereon. Having adjusted and arranged the apparatus substantially as in Fig. 1, the funeral director should place trestles on the ground so as to extend across the grave and above the decorations, for supporting the casket temporarily, while in some cases the funeral ceremonies may be performed. When ready to lower the casket into the grave the operating arms are raised and turned to approximately upright position so as to rotate the side rails and swing the wings down opposite the side walls of the grave, as illustrated in Fig. 2, and then the casket is to be lowered into the grave and the side wings returned, after which it is designed that the mourners depart, and then the decoration holder is to be removed to permit the grave to be filled in. It will be understood that the parts of the apparatus may readily be disconnected one from another so as to occupy relatively small space while being handled or conveyed from place to place.

Having thus described the invention, what is claimed as new, is—

1. A floral decoration holder including two rotatably supported rails, each rail having a wing on one side for holding floral decorations and having also a counterweight on the opposite side for maintaining the wings temporarily in horizontal position.

2. A floral decoration holder including two rails provided each with a wing for holding floral decorations, means for rotatably supporting the rails, and two operating arms adjustably connected to the two rails respectively.

3. A floral decoration holder including two rails provided each with a wing for holding floral decorations, means for rotatably supporting the rails, and two operating arms detachably connected to the two rails respectively.

4. A floral decoration holder including two rails provided each with a wing for holding floral decorations, means for rotatably supporting the rails, and two operating arms connected to the two rails respectively and having each a weight adjustably secured thereto.

5. A floral decoration holder including two rails provided each with an operating arm, means for rotatably supporting the rails, and a plurality of wings mounted on the two rails respectively and having each a multiplicity of clasps on one side thereof for holding the decorations.

6. A floral decoration holder including a frame comprising a head rail and a foot rail and two side rails rotatably mounted on the head and foot rails, the side rails being provided with operating arms, and wings for holding decorations mounted on the side rails.

7. A floral decoration holder including two supporting end rails, two relatively longer side rails removably supported rotatably on the supporting rails and provided with decoration-holding wings, the side rails having each an operating arm thereon, and decoration-holding wings removably hung on the supporting rails.

8. A floral decoration holder including two supporting rails, two side rails rotatably mounted on the supporting rails and having each an operating arm thereon, a plurality of wings removably connected to the two side rails for holding decorations, and devices for detachably connecting adjacent wings together.

9. A floral decoration holder including two supporting rails, two side rails rotatably mounted on the supporting rails and comprising each a plurality of detachable sections, each section having holes in the wall thereof, a plurality of wings, one for each section, each wing having two crooked arms adapted to be removably secured in the holes, and clasps mounted on the wings.

10. A floral decoration holder including supporting devices provided with journal bearings, two rails rotatably supported in the bearings, each rail comprising a plurality of detachable sections, one section of each rail being provided with an operating arm, and a plurality of wings for holding decorations connected to the rails, a wing to each section thereof.

11. A floral decoration holder including two extensible or contractible supporting rails provided with supporting feet, each one of the feet having a spur on the under side thereof, two side rails rotatably mounted removably on the supporting rails and having each an operating arm thereon, wings detachably connected to the rails, and clasps mounted on the wings.

12. A floral decoration holder including two supporting rails, two side rails rotatably mounted on the supporting rails and having each an operating arm, each side rail being provided with a stop to be moved into contact with one of the supporting rails for limiting the rotative movement of the side rails in one direction, wings connected to the side rails, and clasps mounted on the wings.

13. A floral decoration holder including a head rail and a foot rail comprising each a plurality of telescoping sections, each section having a journal bearing therein and provided with a supporting leg, two side rails rotatably mounted in the journal bearings and having each an operating arm thereon, decoration-holding wings mounted on the side rails, and decoration holding wings hung removably on the head rail and foot rail respectively.

In testimony whereof, I affix my signature in presence of two witnesses.

DAVID A. LYTLE.

Witnesses:
E. T. SILVIUS,
J. H. GARDNER.

Copies of this patent may be obtained for five cents each, by addressing the "Commissioner of Patents, Washington, D. C."